(12) United States Patent
Vogel et al.

(10) Patent No.: US 9,133,809 B2
(45) Date of Patent: Sep. 15, 2015

(54) FLYWHEEL ARRANGEMENT FOR AN INTERNAL COMBUSTION ENGINE

(71) Applicant: MAN Truck & Bus AG, Munich (DE)

(72) Inventors: Werner Vogel, Burgoberbach (DE); Markus Lampalzer, Feucht (DE); Josef Geissler, Augsburg (DE); Bernd Schreiner, Munich (DE); Michael Patla, Fuerth (DE)

(73) Assignee: MAN TRUCK & BUS AG, Munich (DE)

( * ) Notice: Subject to any disclaimer, the term of this patent is extended or adjusted under 35 U.S.C. 154(b) by 259 days.

(21) Appl. No.: 13/773,980

(22) Filed: Feb. 22, 2013

(65) Prior Publication Data

US 2013/0213183 A1    Aug. 22, 2013

(30) Foreign Application Priority Data

Feb. 22, 2012    (DE) .......................... 10 2012 003 385

(51) Int. Cl.
| | |
|---|---|
| F02N 15/02 | (2006.01) |
| F02N 11/00 | (2006.01) |
| F02N 11/04 | (2006.01) |
| F02N 15/00 | (2006.01) |

(52) U.S. Cl.
CPC ................ *F02N 11/00* (2013.01); *F02N 11/04* (2013.01); *F02N 15/006* (2013.01); *Y10T 74/134* (2015.01)

(58) Field of Classification Search
CPC ........ B60K 6/26; B60K 41/222; B60K 6/105; F02N 11/04; F02N 11/00; F02N 11/0814; F02N 15/022; F02N 15/025

USPC .......... 123/179.22, 179.28, 149 D, 242, 246, 123/249, 149 E, 179.25; 74/5.95, 433.5, 74/572.1, 572.11, 572.2, 6; 290/18, 19, 290/22, 31

See application file for complete search history.

(56) References Cited

U.S. PATENT DOCUMENTS

| | | | | |
|---|---|---|---|---|
| 6,294,854 | B1 * | 9/2001 | Grosspietsch et al. .......... 310/92 |
| 6,306,057 | B1 * | 10/2001 | Morisawa et al. ................ 475/5 |
| 6,561,336 | B1 * | 5/2003 | Huart et al. .............. 192/70.252 |
| 7,108,626 | B2 * | 9/2006 | Friedmann ........................ 475/8 |
| 7,318,403 | B1 * | 1/2008 | Huart et al. .............. 123/179.28 |
| 7,510,065 | B2 * | 3/2009 | Taylor et al. .................. 192/115 |
| 2005/0045135 | A1 * | 3/2005 | Taylor et al. ............. 123/179.25 |
| 2005/0101432 | A1 * | 5/2005 | Pels et al. .......................... 477/5 |

* cited by examiner

*Primary Examiner* — Lindsay Low
*Assistant Examiner* — Long T Tran
(74) *Attorney, Agent, or Firm* — Lucas & Mercanti, LLP

(57) ABSTRACT

An arrangement for an internal combustion engine, including a flywheel connectable the crankshaft of the internal combustion engine, a starter generator arranged in a housing of the flywheel, and a friction clutch, which connects the flywheel to a transmission. An intermediate piece is fastened to the output side of the flywheel, such that a torque-transmitting fastening of the intermediate piece to the flywheel is arranged radially to the inside of a torque-transmitting fastening of the intermediate piece to the friction clutch, with respect to the radial spacing from the axis of rotation of the flywheel, and that the intermediate piece forms the abutment for a friction lining of the friction clutch at an abutment surface.

18 Claims, 2 Drawing Sheets

FLYWHEEL ARRANGEMENT FOR AN INTERNAL COMBUSTION ENGINE

CROSS-REFERENCE TO RELATED APPLICATIONS

This application claims the priority of DE 10 2012 003 385.0 filed Feb. 22, 2012, which is incorporated by reference herein.

BACKGROUND OF THE INVENTION

The invention relates to an arrangement for an internal combustion engine, a flywheel arrangeable on the crankshaft of the internal combustion engine, a starter generator arranged in a housing of the flywheel, and a friction clutch, which connects the flywheel to a transmission.

SUMMARY OF THE INVENTION

It is the underlying object of the invention to improve a drive train of an internal combustion engine operating with a starter generator, wherein the entire subassembly has small dimensions, at least in the axial direction, despite the arrangement of the starter generator in the region between the flywheel and the friction clutch. It is furthermore an object of the invention to keep the mounting of the entire subassembly and the manufacture of the individual components as economical as possible. It is another object of the invention to allow a modular solution, enabling different types of transmission (manual or automatic transmissions) or transmission connections to be mounted on a flywheel according to the invention.

It is regarded as the core of the invention that an intermediate piece is fastened to the output side of the flywheel, such that the torque-transmitting fastening of the intermediate piece to the flywheel is arranged radially to the inside of a torque-transmitting fastening of the intermediate piece to the friction clutch, based on the radial spacing from the axis of rotation of the flywheel, and that the intermediate piece has an abutment surface of the abutment for a friction lining of the friction clutch. Thus, the radial spacing of the flywheel/intermediate piece fastening is smaller than the radial spacing of the intermediate piece/friction clutch spacing. Hence, the fastening between the intermediate piece and the friction clutch is arranged radially to the outside of the fastening between the flywheel and the intermediate piece.

In general terms, the starter generator is to be understood to mean an electric machine which has at least a generator function and hence can convert torques within the drive train into electrical energy in a generator operating phase. At least for certain operating phases of the internal combustion engine, the starter generator can also function as an element which imparts rotary motion to the crankshaft (starter function). Through the provision of an intermediate piece which is releasably fastened to the flywheel, on the one hand, and to the friction clutch, on the other hand, a solution for the implementation of the necessary functions which is small in size and economical as regards the individual components is achieved. Economical production can be achieved by virtue of the fact that the abutment surface for the friction clutch, on which the friction lining for torque transmission rests, is provided on the intermediate element. In particular, the radially outer connection between the intermediate piece and the friction clutch and, at the same time, the placing of the fastening of the intermediate piece to the flywheel in a position radially to the inside thereof likewise permit a transmission unit of small size and compact configuration.

In a preferred embodiment, the starter generator has a stator and a rotor, wherein the stator is fastened at least in some regions to the flywheel housing surrounding the flywheel and/or is fastened in some regions to a housing which fits over the friction clutch. By virtue of the fact that the fixing of the position of the stator can be assigned to the flywheel and/or friction clutch housing, a reduction in components can be achieved, especially in the case of an integral design.

It is furthermore advantageous if the rotor of the starter generator is fastened at least in some regions to the flywheel and/or at least in some regions to the intermediate piece. Such fastening comprises fastening the rotor element in a manner secure against twisting relative to the flywheel and relative to the intermediate piece, Although, in such a design, the rotor always accompanies the motion of the flywheel, a rotor that is permanently taken along in the drive train allows a spatially compact technical solution to the integration of a starter generator within a drive train of an internal combustion engine.

In this arrangement, the rotor is positively and/or nonpositively restricted, at least in its axial mobility, by adjacent regions of the flywheel and of the intermediate piece. Preferably, the positive or nonpositive connection has an effect on the rotor such that it cannot perform any axial movement in the fully assembled state. The positive connection of the rotor can be accomplished, for example, by means of contact on both sides between the flywheel and the intermediate piece and the rotor. Nonpositive connection can be accomplished by clamping the rotor between a region of the flywheel and the intermediate piece. A positive and/or nonpositive connection of the rotor to the flywheel and/or to the intermediate piece can also be used to ensure that the rotor is secured against twisting relative to the flywheel and/or to the intermediate piece. Such security against twisting can be accomplished by means of a press-fit joint or some other nonpositive joint, for example. In this case, it is possible, in the fully assembled state, for a raised region of the intermediate piece to engage in a corresponding recess in the rotor, for example, and, by means of this positive engagement, to prevent twisting of the rotor relative to the intermediate piece and, ultimately, also relative to the flywheel. In a preferred embodiment, the rotor is of disc-, prism- or cylinder-type design, with a positive or nonpositive engagement or action taking place at the ends of the rotor.

In another advantageous embodiment, the intermediate piece is of disc-, cylinder- and/or prism-type design and has an accommodation region for a drive shaft element in its center. The accommodation region supports the drive shaft element in a manner which allows rotary motion, although furthermore in such a way that support of the drive shaft element in the radial direction is ensured. For example, a ball bearing or a bearing body of some other kind can be arranged with nonpositive or positive engagement in the accommodation region. In the preferred embodiment, a ball bearing is pressed into a circular accommodation region. Particularly in the case of a disc-type design of the intermediate piece, it is advantageous if the accommodation region comprises a collar section, which is aligned facing away from the flywheel in the assembled state. This collar section offers an enlarged surface for the fastening of a bearing body.

It has furthermore proven advantageous if the surface of the intermediate piece which faces the flywheel in the fully assembled state has at least one centering engagement element, which engages in a mating centering element on the flywheel. By means of a centering means of this kind for connecting the flywheel and the intermediate piece, it is possible, for example, to ensure tightly toleranced axial parallelism and/or positional alignment of the two elements and, in turn, of the bodies to be connected to said elements. A small chain tolerance, that is to say small cumulative individual tolerances over a plurality of components placed one against the other, is thereby achieved. In this case, it is possible, for example, for the centering engagement element to be designed as an annular bead or as raised portions arranged on a circular ring, and for the mating centering element to be designed as a surface segment corresponding to the annular bead or to the raised portions arranged on a circular ring.

A further advantageous measure envisages that the spacing of the fastening means for fixing the intermediate piece to the flywheel from the axis of rotation corresponds to 0.3 to 0.7 times, preferably 0.4 to 0.6 times, the spacing of the fastening means for fixing the intermediate piece to the clutch housing. On the one hand, the fastening means for fastening the intermediate piece to the flywheel is thus arranged on the inside relative to the fastening means for fixing the intermediate piece to the clutch. By virtue of the fact that the two fastening means in this relationship are relatively far from the axis of rotation, an arrangement of the fastening means for fastening the intermediate piece to the clutch in a position relatively far out is possible and, at the same time, advantageous fastening of the fastening means spaced apart sufficiently from the axis of rotation is achieved, with the result that even the mass of this fastening means has a positive effect (increase in mass) on the inertial mass of the flywheel. Moreover, the increase in mass remote from the axis ensures an effective increase in strength and/or rigidity.

In this context, it can furthermore be advantageous if the spacing of the rotor from the axis of rotation corresponds to 1.05 to 1.40 times the spacing of the fastening means for fixing the intermediate piece to the flywheel from the axis of rotation. As a result, the fastening means for fastening the intermediate piece to the flywheel is arranged further inwards relative to the rotor and, at the same time, is arranged at a defined maximum spacing with respect thereto. It is expedient here if the fastening means either reaches directly into or through the material of the rotor and/or if the fastening means reaches directly into or through regions of the intermediate element which support the rotor and/or directly into or through regions of the flywheel which support the rotor. By virtue of the fact that the arrangement of the fastening means for fixing the intermediate piece to the flywheel is arranged in the vicinity of the rotor, that region of the intermediate piece or flywheel which supports the rotor, for example, can simultaneously perform the function of accommodating the fastening means for fastening the intermediate piece to the flywheel.

It has furthermore proven expedient if the intermediate piece has, in the radially inner region thereof, at least one feed-through aperture, which is designed in such a way that, in the assembled state of the intermediate piece and the flywheel, a fastening means can be fed through and/or a fastening means can be handed through the feed-through aperture, preferably by means of a tool, wherein the fastening means is used to fix the flywheel to a crankshaft. This measure makes it possible for the subassembly consisting of the flywheel, the intermediate piece, and the fastening means between the flywheel and the intermediate element to be released as a whole from the crankshaft. For this purpose, engagement with the screw head of the screws that fix the flywheel on the crankshaft can be accomplished, for example, by a tool reaching through the feed-through aperture, and said screws can be released and removed through the feed-through aperture. In the opposite case, assembly and hence pre-grouping of the intermediate piece, the flywheel and the fastening screw for the intermediate piece and the flywheel can be performed in this way, and this construction unit as a whole can be screwed to the crankshaft, preferably with the rotor in addition.

In another advantageous embodiment, at least one fastening means for fixing the flywheel to the crankshaft is simultaneously used as a fastening means for fixing the intermediate piece to the flywheel. This makes it possible to reduce the number of fastening means and to achieve both the connection of the intermediate piece and the flywheel and, at the same time, the connection of the flywheel and the crankshaft with one fastening means.

In another advantageous embodiment of the invention, the ratio of the radius of the intermediate piece to the maximum width thereof is 2 to 5, preferably 2.8 to 4.2, particularly preferably 3.3 to 3.9. By means of this ratio, it is possible to achieve a substantially narrower and disc-type intermediate piece which, on the one hand, can be manufactured in an advantageous way and, on the other hand, increases the axial overall length of the arrangement to a slight extent.

Provision can furthermore be made for a toothed rim to be arranged on an outer circumference of the flywheel, wherein the toothed rim is preferably connected to a further electric motor by means of at least one gearwheel. This electric motor can be designed purely as a starting unit, for example, and used to impart rotary motion to the engine and thus start it. With this electric motor and the starter generator, the arrangement thus comprises two units that initiate starting, it being possible, in this case, to achieve an advantageous "division of labour" between the two units by virtue of the fact that the electric motor acting via the toothed rim is used to start the engine in the case of "unfavourable" engine conditions, and the starter generator, which is seated by means of the rotor thereof on the flywheel, performs starting in the case of "favourable" engine conditions. This can mean that the electric motor is used to start a cold engine (unfavourable engine condition), and that starting is performed by means of the starter generator above a certain temperature of the engine or of an engine lubricant. Particularly in the case of the designs in which an electric motor is provided in the drive train in addition to the starter generator, the intermediate piece according to the invention is advantageous, since the starter generator can be designed for a lower performance capability and can thus be arranged between the flywheel and the intermediate piece and/or on at least one of these two elements.

A particularly preferred embodiment of the invention envisages that the starter generator in general and the toothed rim on the flywheel should be arranged at a distance from the axis of rotation. In this case, the toothed rim is preferably located on facing the engine and, at the same time, in the outer region (at least in the outermost tenth of the radius) of the flywheel. The masses of the toothed rim and the starter generator can thus be used as an effective flywheel mass. The toothed rim engages in a starter and the drive pinion thereof, said starter being arranged as far as possible on the engine side and close to the flywheel.

It is advantageous if the toothed rim arranged on the flywheel is arranged on the opposite side of the flywheel or the side of the flywheel facing away from the intermediate piece or the starter generator.

It has furthermore proven advantageous if a cooling device is provided in the region of the starter generator, in particular in the region of the supporting region of the stator (e.g. at a maximum spacing of 5 cm). This cooling device can comprise a liquid cooling system, preferably a water cooling system, which is operatively connected to the cooling circuit of an engine connected to the flywheel housing, wherein cooling ducts of the cooling device are passed through openings in the flywheel housing and/or are integrated at least in some regions into recesses and/or cavities of the flywheel housing. For this purpose, the flywheel housing can be provided on the outside with connection points for the feed and discharge, and the cooling medium can be passed between the feed and discharge in (multi- or single-part) cooling ducts built integrally into the flywheel housing. In this case, the cooling duct can be integrated integrally into the flywheel housing, at least in some regions, and/or can be formed, at least in some regions, by an accommodation region of the flywheel housing and a covering element placed in a sealing manner on said accommodation region. By means of the cooling device, heat generated by the starter generator can be dissipated in order in this way to increase the output in generator mode. In the case where at least part of the cooling duct is embodied as a separate component (e.g. a covering element), it is advantageous if said separate component is fed through the same opening as the cabling of the starter generator, with the cabling and the separate component of the cooling duct being installed as a subassembly on the flywheel housing, for example. By virtue of the spatial proximity of the cooling duct and the cabling, cooling and/or heating of the cabling of the starter generator can be achieved, even outside the more restricted area around the starter generator. As an alternative or in addition to the described arrangement of the cooling device and of the cooling duct thereof in the region of the flywheel housing, it is possible to arrange the cooling device and the cooling ducts thereof in or on the housing means, at least in some regions. In this context, the housing means is a housing that adjoins that side of the flywheel housing which faces away from the engine and that surrounds at least parts of the drive train (clutch, intermediate piece, shaft body and/or the flywheel). By virtue of the arrangement and proximity of the cooling device described above to the starter generator, said cooling device is thus suitable for dissipating waste heat from the starter generator.

BRIEF DESCRIPTION OF THE DRAWINGS

The invention is explained in greater detail with reference to illustrative embodiments in the figures of the drawing, in which.

DETAILED DESCRIPTION OF THE PRESENT INVENTION

Figure 1:
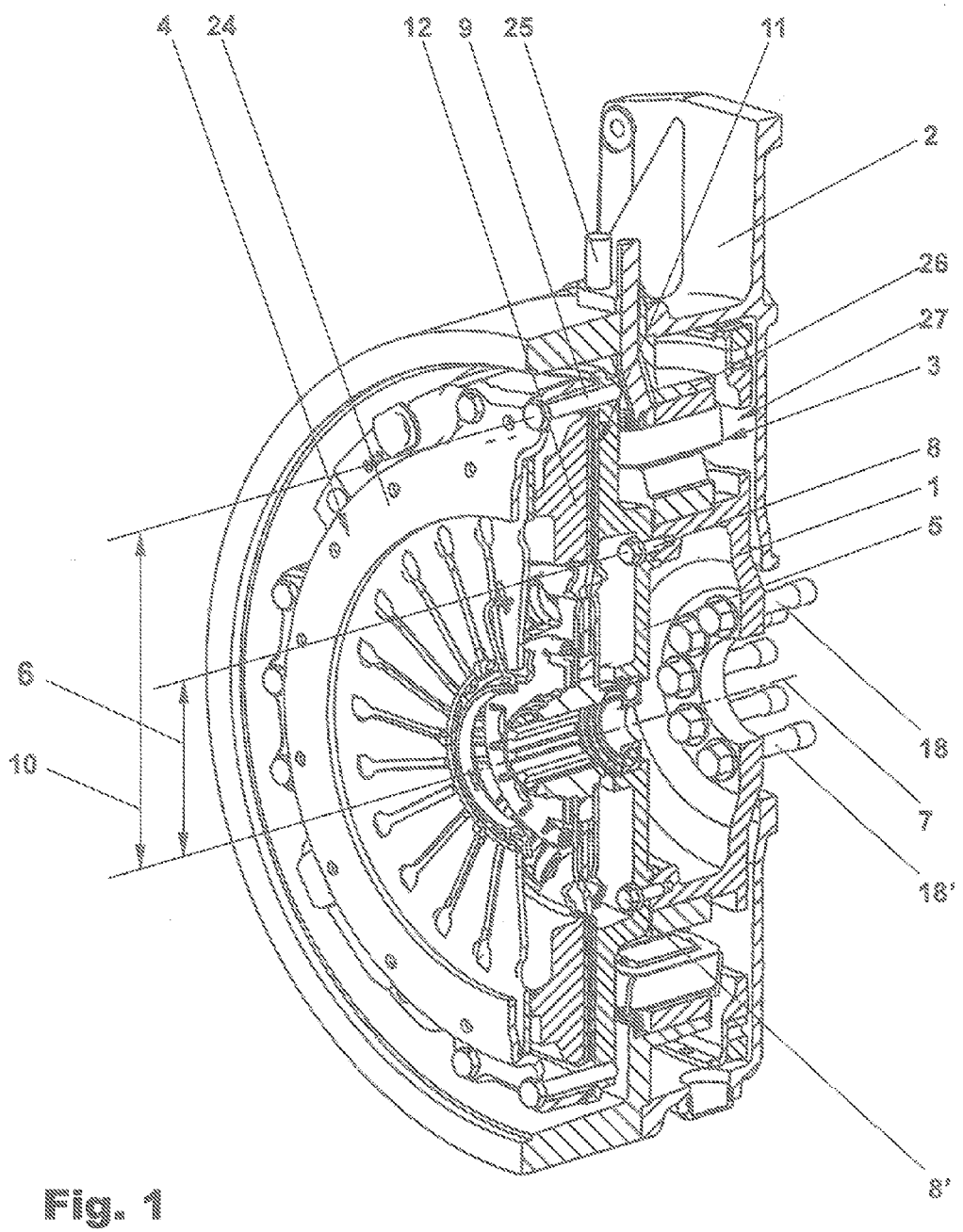
FIG. 1 shows a perspective full sectional view of an arrangement according to the invention.
Figure 2:
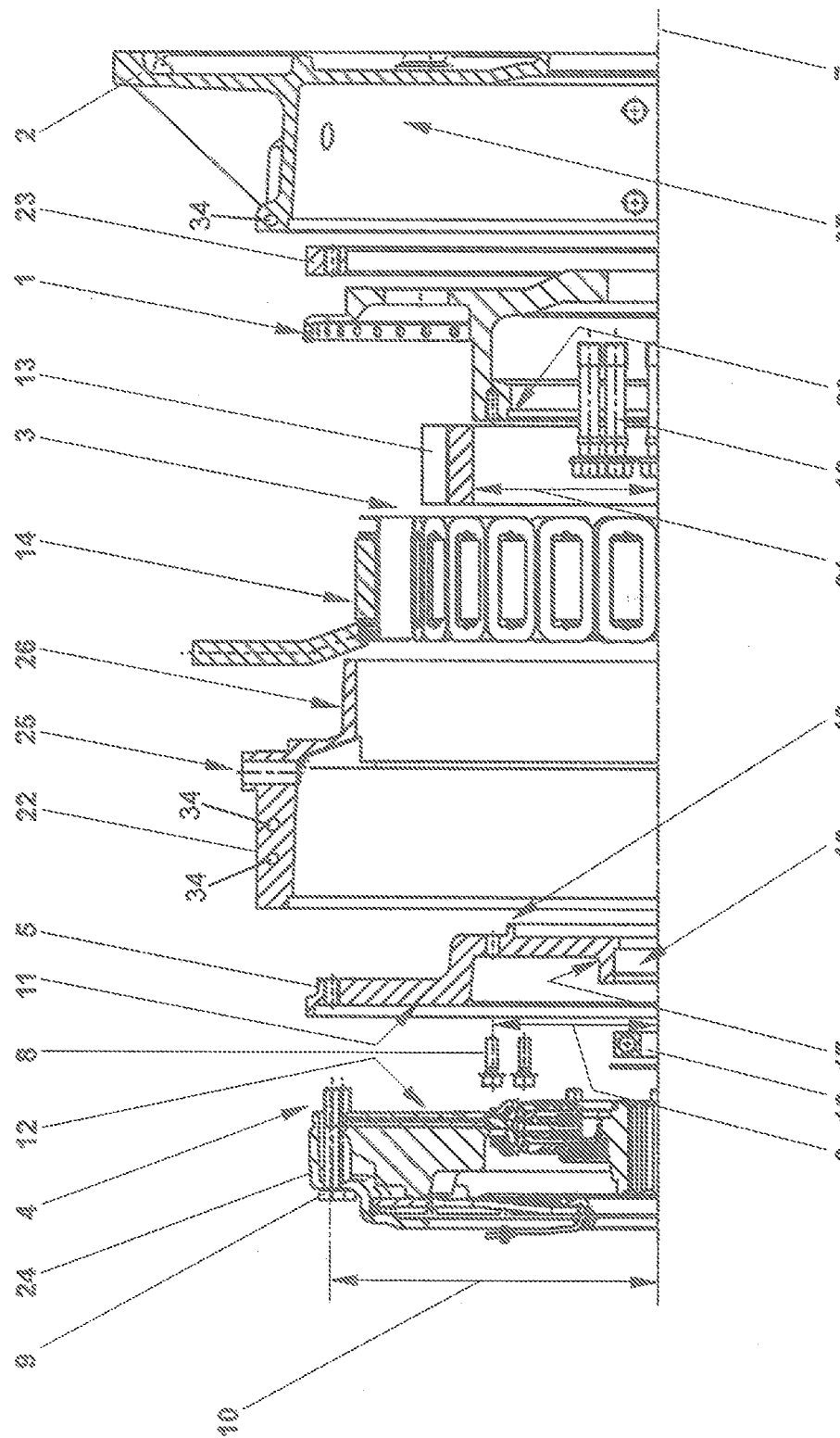
FIG. 2 shows a schematic exploded sectional view of the arrangement shown in FIG. 1 in full section.

The figures of the drawing show an arrangement comprising an internal combustion engine (not shown), a flywheel 1 arranged on the crankshaft (not shown) of the internal combustion engine, a starter generator 3 arranged in a housing 2 of the flywheel, and a friction clutch 4 connecting the flywheel 1 to the transmission (not shown). On the output side of the flywheel 1, the side facing the friction clutch 4, an intermediate piece 5 is fastened in such a way that the torque-transmitting fastening 8 of the intermediate piece 5 to the flywheel 1 is arranged on the inside, based on the radial spacing 6 from the axis of rotation 7 of the flywheel 1, the torque-transmitting fastening 9 of the intermediate piece 5 to the friction clutch 4 is arranged radially on the outside, based on the radial spacing 10 from the axis of rotation 7 of the flywheel 1, and that the intermediate piece 5 forms the abutment for a friction lining 12 of the friction clutch 4 at an abutment surface 11. By virtue of the fact that the intermediate piece 5 can be fastened releasably to the flywheel 1 by means of fastening means 8, it is also possible for some other type of intermediate piece (not shown) to be mounted on an identical flywheel 1 instead of the friction clutch 4 illustrated, in order to ensure connection of the flywheel 1 to coupling devices (not shown) of a different type, preferably having a flexible transmission element. It is thereby possible to implement a modular principle.

The starter generator 3 has a rotor 13 and a stator 14, wherein the rotor 13 is arranged on the flywheel 1 and forms a positive contact/connection between the flywheel 1 and the intermediate piece 5 and is hence fastened in a fixed position relative to the flywheel 1 and the intermediate piece 5.

It is advantageous if the fastening 8 for fixing the intermediate piece 5 to the flywheel 1 is of heat-conducting design. For this purpose, it is possible, for example, to use a heat-conducting film in order to transmit the heat arising at the abutment surface 11 as quickly as possible to the flywheel 1. Heat-conducting films are known, for example, from EDP engineering for cooling processors and consist of ceramic films, for example.

In the embodiment illustrated, the intermediate piece 5 is of disc-shaped design and has in the center thereof an accommodation region 15, which serves to accommodate a drive shaft element (not shown) and accommodates the latter in a manner which allows rotary motion. By virtue of the accommodation of an output shaft element in the accommodation region 15 in a manner which allows rotary motion, the output shaft element is supported in the radial direction, and a bearing body 16 is particularly preferably used for this purpose in the accommodation region 15. In connection with the accommodation region 15, it has proven advantageous to provide the intermediate piece 5 in the accommodation region 15 with a collar section 17, which is aligned facing away from the flywheel 1 in the fully assembled state.

The flywheel 1 is connected to the crankshaft (not shown) by means of fastening means 18, 18'. In this case, provision can be made for the intermediate piece 5 to have feed-through apertures (not shown), through which the fastening means 18, 18' can be fed or at least one tool can be fed through said feed-through apertures in the assembled state of the intermediate piece 5 and the flywheel 1 in order to manipulate the fastening means 18, 18'.

A centering means engagement element 19, which engages in a corresponding mating centering element 20 on the flywheel, is arranged on the surface of the intermediate piece which faces the flywheel 1 in the fully assembled state. In the embodiment illustrated, the centering engagement element 19 is designed as an annular bead, and the mating centering element 20 is designed as a surface segment corresponding to said annular bead. The spacing 6 of the fastening means (fastening 8) for fixing the intermediate piece 5 to the flywheel 1 from the axis of rotation 7 corresponds to 0.3 to 0.7 times the spacing 10 of the fastening means (fastening 9) for fixing the intermediate piece 5 to the clutch housing 24 of the friction clutch 4. In the embodiment illustrated, the rotor 13 is of annular design, wherein the spacing 21 thereof from the axis of rotation 7 and therefore the inside diameter thereof corresponds to 1.00 to 1.40 times the spacing 6 of the fastening means (fastening 8) for fixing the intermediate piece 5 to the flywheel 1 from the axis of rotation 7. The stator 14 is preferably arranged in the region of the housing 2 which surrounds the flywheel 1. A toothed rim 23, which is connected to an electric motor/generator (not shown), is arranged on the side of the flywheel 1 facing the crankshaft. This electric motor/generator, which has at least the function of an electric motor, serves as an additional starting option for imparting rotary motion to the crankshaft. This arrangement thus has two options for introducing torque into the crankshaft for the purpose of starting the engine. On the one hand, there is that of the starter generator 3 and, on the other hand, there is the energy introduced into the toothed rim 23 by means of the electric motor/generator, it is particularly preferred if the electric motor/generator engaging by means of the toothed rim 23 is used when the engine is cold, and the starting element of the starter generator 3 is employed when the engine is warm and there is therefore a lower resistance to the imparting of rotary motion to the crankshaft.

It is expedient if, in the fully assembled state, the longitudinal center line of the fastening means for fixing the flywheel 1 to the crankshaft is aligned parallel to the longitudinal center line of the fastening means for fixing the intermediate piece 5 to the flywheel 1 and/or parallel to the longitudinal center line of the fastening means for fixing the clutch to the intermediate piece 5. It is also advantageous if the joining direction and hence the direction in which the screw heads of the fastening means 8, 8', 18, 18' designed as screws for the flywheel/crankshaft connections and intermediate piece/flywheel connections are aligned are in the same direction.

The friction clutch 4 comprises a pressure plate, which has a friction lining 12, and an inner friction clutch housing 24, which connects the friction clutch 4 to the intermediate piece 5 by way of the fastening 9 by means of screws. The friction clutch 4 itself is arranged within housing 22. Housing 22 has an opening 25, into which components (in this case cables) of the starter generator 3 are fed through. Housing 22 furthermore has a support region 26, which is offset radially inwards towards the outer circumferential surface, extends in the manner of a ring in the direction of the crankshaft and on which the stator 14 of the starter generator 3 is arranged. It is advantageous here that the annular support region 26 of housing 22 projects into the inner region 27 of housing 2 of the flywheel 1 and/or is arranged at least partially therewithin. The circumferential surface of housing 22 is approximately at the level of that section of housing 2 which surrounds the flywheel 1. The circumferential surface preferably ends approximately flush with that region of housing 2 which surrounds the flywheel. The offset of the support region 26 with respect to the circumferential surface allows at least partial assembly of housing 2 and housing 22. Housing 22 is referred to as housing means in connection with a cooling device (not shown) in the above part of the description.

A cooling duct 34 of the cooling device can be arranged in the region of housing (means) 22 and/or of the flywheel housing 2, wherein said cooling duct is preferably formed integrally with housing 22 and/or the flywheel housing 2, at least in some regions, such that, at least in a partial region of the cooling duct, part of the cooling duct cross section s formed by a recess (not shown) in housing 22 and/or in the flywheel housing 2 and another part of the cooling duct cross section is formed by a covering element (not shown).

List Of Reference Signs

1 flywheel
2 housing of 1
3 starter generator
4 friction clutch
5 intermediate piece
6 spacing between 7 and 8
7 axis of rotation
8 fastening between 1 and 5
9 fastening between 4 and 5
10 spacing between 7 and 9
11 abutment surface
12 friction lining
13 rotor
14 stator
15 accommodation region
16 bearing body
17 collar section
18, 18' fastening means between 1 and crankshaft
19 centering means engagement element
20 mating centering element
21 spacing
22 housing of 4
23 toothed rim
24 friction clutch housing
25 opening of 22
26 support region of 22
27 inner region of 2

The invention claimed is:

1. An arrangement connectable to an internal combustion engine with a crankshaft, the arrangement comprising:
    a flywheel connectable to the crankshaft of the internal combustion engine;
    a flywheel housing;
    a starter generator arranged in said flywheel housing;
    a friction clutch connected to said flywheel, wherein said friction clutch connects said flywheel to a transmission;
    an intermediate piece connected between an output side of said flywheel and said friction clutch, a torque transmitting fastening of said intermediate piece to said flywheel is arranged radially outside of a torque transmitting fastening of said intermediate piece to an inner friction clutch housing of said friction clutch, with respect to an axis of rotation of said flywheel; and
    an abutment surface on said intermediate piece forming an abutment for a friction lining of said friction clutch,
    wherein a spacing of said torque transmitting fastening of said intermediate piece to said flywheel from said axis of rotation corresponds to 0.3 to 0.7 times a spacing of said torque transmitting fastening of said intermediate pieces to said inner friction clutch housing of said friction clutch.

2. The arrangement according to claim 1, wherein said starter generator comprises a stator and a rotor, said stator being fastened at least in some regions to one of said flywheel housing and a housing that fits over said friction clutch.

3. The arrangement according to claim 2, wherein, in the fully assembled state of the arrangement, said friction clutch is surrounded at least in some regions by a housing having an annular support region offset radially inwards, which extends in the manner of a ring toward the crankshaft and on which said stator is arranged, and wherein, in the fully assembled state of the arrangement, and one of:
    the annular support region one of projects into an inner region of said flywheel housing and is arranged therewithin, and
    a cooling device for dissipating waste heat from said starter generator is arranged in a region of at least one of said housing and said flywheel housing.

4. The arrangement according to claim 1, wherein said starter generator comprises a stator and a rotor, said rotor being fastened at least in some regions to one of said flywheel and said intermediate piece.

5. The arrangement according to claim 4, wherein said rotor is restricted at least in one of an axial mobility and a rotational mobility, by adjacent regions of said flywheel and of said intermediate piece.

6. The arrangement according to claim 5, wherein axial displacement of said rotor is prevented by said flywheel and said intermediate piece.

7. The arrangement according to claim 1, wherein said intermediate piece is disc-shaped, cylinder-shaped, or prism-shaped and preferably comprises an accommodation region for an output shaft element in a center, said accommodation region ensuring accommodation that allows rotary motion and ensuring support in the radial direction of the output shaft element, said accommodation region comprising a bearing body.

8. The arrangement according to claim 7, wherein said intermediate piece comprises a collar section on said accommodation region, which is aligned facing away from said flywheel in the assembled state.

9. The arrangement according to claim 1, wherein a surface of said intermediate piece facing said flywheel in the assembled state has at least one centering engagement element, which engages in a mating centering element on said flywheel, wherein said centering engagement element is an annular bead or raised portions arranged on a circular ring, and said mating centering element is a surface segment corresponding to said annular bead or said raised portions arranged on a circular ring.

10. The arrangement according to claim 1, wherein the spacing of said torque transmitting fastening of said intermediate piece to said flywheel from said axis of rotation corresponds to 04 to 0.6 times the spacing of said torque transmitting fastening of said intermediate piece to said inner friction clutch housing of said friction clutch.

11. The arrangement according to claim 1, wherein a spacing of a rotor of said starter generator from said axis of rotation corresponds to 1.05 to 1.40 times the spacing of said torque transmitting fastening of said intermediate piece to said flywheel from the axis of rotation.

12. The arrangement according to claim 1, wherein said intermediate piece has, in a radially inner region thereof, at least one feed-through aperture arranged such that, in the assembled state of said intermediate piece and said flywheel, a fastening device can be one of fed through and handed through the feed-through aperture, the fastening device being used to fix said flywheel to the crankshaft.

13. The arrangement according to claim 12, wherein, in the fully assembled state of the arrangement, a longitudinal center line of said fastening device for fixing said flywheel to the crankshaft is aligned parallel to at least one of a longitudinal center line of the torque transmitting fastening of said intermediate piece to said flywheel and a longitudinal center line of the torque transmitting fastening of said friction clutch to said intermediate piece.

14. The arrangement according to claim 1, wherein at least one fastening device for fixing said flywheel to the crankshaft is simultaneously used for fixing said intermediate piece to said flywheel.

15. The arrangement according to claim 1, wherein a ratio of a radius of said intermediate piece to a maximum width thereof is 2 to 5.

16. The arrangement according to claim 15, wherein the ratio is 2.8 to 4.2.

17. The arrangement according to claim 16, wherein the ratio is 3.3 to 3.9.

18. The arrangement according to claim 1, further comprising a toothed rim disposed on an outer circumference of said flywheel, wherein said toothed rim connectable to a further electric motor by at least one gearwheel.

\* \* \* \* \*